US011050228B2

(12) United States Patent
Byrne et al.

(10) Patent No.: US 11,050,228 B2
(45) Date of Patent: Jun. 29, 2021

(54) POKE-THROUGH ELECTRICAL OUTLET ASSEMBLY WITH LEVELING BEZEL

(71) Applicants: Norman R. Byrne, Ada, MI (US); Aaron G. Lautenbach, Rockford, MI (US); Matthew R. Haller, Grandville, MI (US); Marc A. Mitchell, Belmont, MI (US)

(72) Inventors: Norman R. Byrne, Ada, MI (US); Aaron G. Lautenbach, Rockford, MI (US); Matthew R. Haller, Grandville, MI (US); Marc A. Mitchell, Belmont, MI (US)

( * ) Notice: Subject to any disclaimer, the term of this patent is extended or adjusted under 35 U.S.C. 154(b) by 0 days.

(21) Appl. No.: 17/014,119

(22) Filed: Sep. 8, 2020

(65) Prior Publication Data

US 2020/0403391 A1 Dec. 24, 2020

Related U.S. Application Data

(63) Continuation of application No. 16/536,471, filed on Aug. 9, 2019, now Pat. No. 10,770,875.

(60) Provisional application No. 62/720,482, filed on Aug. 21, 2018, provisional application No. 62/717,604, (Continued)

(51) Int. Cl.
| | |
|---|---|
| *H02G 3/14* | (2006.01) |
| *H02G 3/08* | (2006.01) |
| *H02G 3/12* | (2006.01) |
| *H01R 13/518* | (2006.01) |
| *H01R 27/00* | (2006.01) |

(52) U.S. Cl.
CPC .............. *H02G 3/081* (2013.01); *H02G 3/12* (2013.01); *H02G 3/14* (2013.01); *H01R 13/518* (2013.01); *H01R 27/00* (2013.01)

(58) Field of Classification Search
CPC ....................................................... H02G 2/081
USPC ........................................................... 174/560
See application file for complete search history.

(56) References Cited

U.S. PATENT DOCUMENTS

| 1,767,323 A | 6/1930 | Staples |
|---|---|---|
| 2,886,630 A | 5/1959 | Leroy |
| 2,969,142 A | 1/1961 | Mack |
| (Continued) | | |

FOREIGN PATENT DOCUMENTS

| CA | 2296190 | 7/2000 |
|---|---|---|
| CH | 647898 | 2/1985 |
| (Continued) | | |

*Primary Examiner* — Stanley Tso
(74) *Attorney, Agent, or Firm* — Gardner, Linn, Burkhart & Ondersma LLP

(57) ABSTRACT

An electrical outlet assembly is mountable in a floor or work surface, and includes an upper bezel and a lower insert that are joined in a non-rigid manner that permits some adjustment to the spacing and/or tilt of the upper bezel relative to the lower insert. The upper bezel and lower insert are joined together by a plurality of fasteners extending between a plurality of fastener receivers coupled to the upper bezel, and to the lower insert. At least one end of each coupling fastener is loosely captured in such a way that when the coupling fasteners are fully secured, they are permitted to move axially relative to the fastener receiver or the lower insert. This allows the lower insert to be repositionable in its axial direction relative to the upper bezel, and also permits the lower insert to be tilted out of alignment with the upper bezel.

18 Claims, 12 Drawing Sheets

Related U.S. Application Data filed on Aug. 10, 2018, provisional application No. 62/718,377, filed on Aug. 13, 2018.

(56) References Cited

U.S. PATENT DOCUMENTS

| | | | |
|---|---|---|---|
| 3,433,886 A | 3/1969 | Myers | |
| 3,865,456 A | 2/1975 | Dola | |
| 3,956,573 A | 5/1976 | Myers et al. | |
| 4,057,164 A | 11/1977 | Maier | |
| 4,091,231 A | 5/1978 | Sotolongo | |
| 4,094,492 A | 6/1978 | Beeman et al. | |
| 4,237,666 A | 12/1980 | Kohaut | |
| 4,259,542 A | 3/1981 | Tehan et al. | |
| 4,451,101 A | 5/1984 | Davis | |
| 4,496,067 A | 1/1985 | Benscoter | |
| 4,591,656 A | 5/1986 | Mohr | |
| 4,770,643 A | 9/1988 | Castellani et al. | |
| 4,916,258 A | 4/1990 | Mohr | |
| 5,010,211 A | 4/1991 | Bartee | |
| 5,023,396 A | 6/1991 | Bartee et al. | |
| 5,032,690 A | 7/1991 | Bloom | |
| 5,107,072 A | 4/1992 | Morgan | |
| 5,147,979 A | 9/1992 | Yang | |
| 5,195,288 A | 3/1993 | Penczak | |
| D356,294 S | 3/1995 | Fladung | |
| 5,422,434 A | 6/1995 | Wuertz et al. | |
| 5,455,388 A | 10/1995 | Pratt | |
| 5,466,886 A | 11/1995 | Lengyel et al. | |
| 5,627,340 A | 5/1997 | Smith et al. | |
| 5,705,772 A | 1/1998 | Brown | |
| 6,018,126 A | 1/2000 | Castellani et al. | |
| 6,114,623 A | 9/2000 | Bonilla et al. | |
| D432,499 S | 10/2000 | Stekelenburg | |
| 6,175,078 B1 | 1/2001 | Bambardekar et al. | |
| 6,265,662 B1 | 7/2001 | Riedy et al. | |
| 6,307,152 B1 | 10/2001 | Bonilla et al. | |
| 6,417,446 B1 | 7/2002 | Whitehead | |
| 6,417,450 B1 | 7/2002 | Young | |
| 6,462,277 B1 | 10/2002 | Young et al. | |
| 6,469,249 B2 | 10/2002 | Capella | |
| 6,483,028 B2 | 11/2002 | DeBartolo, Jr. et al. | |
| 6,495,753 B1 | 12/2002 | Goodsell et al. | |
| 6,545,215 B2 | 4/2003 | Young et al. | |
| 6,551,130 B2 | 4/2003 | Bonilla | |
| 6,552,262 B2 | 4/2003 | English et al. | |
| 6,612,081 B2 | 9/2003 | Cole et al. | |
| 6,635,822 B2 | 10/2003 | Krupa, Jr. | |
| 6,669,041 B2 | 12/2003 | Almond | |
| 6,696,640 B1 | 2/2004 | Castellani et al. | |
| 6,720,495 B2 | 4/2004 | Castellani et al. | |
| 6,750,395 B2 | 6/2004 | Stout et al. | |
| 6,790,084 B1 | 9/2004 | Osborn, Jr. et al. | |
| 6,824,006 B2 | 11/2004 | Lambelet, Jr. | |
| 6,840,785 B2 | 1/2005 | Drane | |
| 6,848,227 B2 | 2/2005 | Inhitty | |
| 6,854,226 B2 | 2/2005 | Cole et al. | |
| 6,887,088 B2 | 5/2005 | Bousquet | |
| 7,053,296 B2 | 5/2006 | Drane et al. | |
| 7,064,268 B2 | 6/2006 | Dinh | |
| 7,078,616 B2 | 7/2006 | Roesch et al. | |
| 7,082,729 B2 | 8/2006 | Cole et al. | |
| 7,105,742 B1 | 9/2006 | Jolly | |
| 7,105,745 B2 | 9/2006 | Drane et al. | |
| 7,183,503 B2 | 2/2007 | Bowman et al. | |
| 7,193,160 B2 | 3/2007 | Dinh | |
| 7,271,351 B2 | 9/2007 | Drane | |
| D553,306 S | 10/2007 | Hansen | |
| 7,276,662 B2 | 10/2007 | Drane | |
| 7,301,100 B2 | 11/2007 | Drane et al. | |
| 7,319,193 B2 | 1/2008 | Halterman | |
| 7,442,883 B2 | 10/2008 | Jolly et al. | |
| 7,511,231 B2 | 3/2009 | Drane et al. | |
| 7,569,776 B2 | 8/2009 | Jolly et al. | |
| 7,586,039 B1 | 9/2009 | Gretz | |
| 7,635,110 B2 | 12/2009 | Galasso et al. | |
| 7,674,990 B2 | 3/2010 | Drane et al. | |
| 7,795,544 B2 | 9/2010 | Peck | |
| 7,838,769 B2 * | 11/2010 | Peck | H02G 3/185 174/58 |
| 7,847,199 B2 | 12/2010 | Drane et al. | |
| 8,052,008 B2 | 11/2011 | Drane et al. | |
| 8,063,317 B2 | 11/2011 | Bowman | |
| 8,242,365 B2 | 8/2012 | Galasso et al. | |
| 8,357,852 B2 | 1/2013 | Drane | |
| 8,581,098 B2 | 11/2013 | Von Gal | |
| D697,872 S | 1/2014 | Roemer et al. | |
| 8,637,780 B2 | 1/2014 | Hunt et al. | |
| 8,878,058 B2 | 11/2014 | Wurms et al. | |
| 8,921,695 B2 | 12/2014 | Drane | |
| 8,944,266 B2 | 2/2015 | Roemer et al. | |
| 9,112,298 B1 | 8/2015 | Hayden et al. | |
| 9,148,007 B2 | 9/2015 | Drane | |
| 9,176,531 B1 | 11/2015 | Hayden et al. | |
| D746,237 S | 12/2015 | Sumwalt et al. | |
| D746,238 S | 12/2015 | Sumwalt et al. | |
| 9,236,723 B2 | 1/2016 | Scanzillo et al. | |
| 9,276,347 B2 | 3/2016 | Wang | |
| 9,257,776 B2 | 8/2016 | Kramer | |
| 9,490,616 B1 | 11/2016 | Galasso et al. | |
| 9,499,373 B1 | 11/2016 | Kim | |
| 9,521,227 B2 | 12/2016 | Kim | |
| 9,560,778 B2 | 1/2017 | Huang | |
| 9,667,053 B2 | 5/2017 | Wurms | |
| 9,673,598 B2 | 6/2017 | DeBartolo, Jr. et al. | |
| 9,685,730 B2 | 6/2017 | Jones et al. | |
| 9,692,219 B2 | 6/2017 | Galasso et al. | |
| 9,705,298 B2 | 7/2017 | Dinh | |
| 9,831,648 B1 | 11/2017 | Gretz | |
| 9,912,134 B2 | 3/2018 | DeBartolo et al. | |
| 9,960,585 B2 | 5/2018 | Galasso et al. | |
| 10,050,424 B2 | 8/2018 | Jones et al. | |
| 10,770,875 B2 | 9/2020 | Byrne et al. | |
| 2005/0133234 A1 * | 6/2005 | Cole | H02G 3/185 174/490 |
| 2005/0170690 A1 * | 8/2005 | Cole | H02G 3/185 439/535 |
| 2010/0150544 A1 | 6/2010 | Koop | |
| 2017/0256930 A1 | 9/2017 | Wurms | |
| 2020/0052432 A1 | 2/2020 | Byrne | |

FOREIGN PATENT DOCUMENTS

| | | |
|---|---|---|
| DE | 4042218 | 2/1992 |
| DE | 202010003879 | 9/2011 |
| EP | 0648000 | 4/1997 |
| EP | 0802599 | 10/1997 |
| EP | 0852418 | 7/1998 |
| GB | 1388873 | 3/1975 |
| GB | 2211364 | 6/1989 |
| GB | 2241389 | 8/1991 |
| JP | H05326064 | 12/1993 |
| JP | H1041031 | 2/1998 |

\* cited by examiner

POKE-THROUGH ELECTRICAL OUTLET ASSEMBLY WITH LEVELING BEZEL

CROSS REFERENCE TO RELATED APPLICATION

The present application in a continuation of U.S. patent application Ser. No. 16/536,471, filed Aug. 9, 2019, now U.S. Pat. No. 10,770,875, which claims the benefit of U.S. provisional application Ser. No. 62/717,604, filed Aug. 10, 2018, U.S. provisional application Ser. No. 62/718,377, filed Aug. 13, 2018, and U.S. provisional application Ser. No. 62/720,482, filed Aug. 21, 2018, which are hereby incorporated herein by reference in their entireties.

FIELD OF THE INVENTION

The present invention relates to power and/or data systems that are mountable in floors or work surfaces such as desks, tables, and the like.

BACKGROUND OF THE INVENTION

Conventional power and data systems provide a variety of interconnections and flexibility. Power and data systems may be inserted into openings formed in floors (including elevated floor systems) and walls, and integrated into furniture, such as tables, desks, and other office furniture. So-called "poke-through" electrical or data units are typically cylindrical or box-like in overall shape, with circular, rectangular, or square surfaces that are exposed in an area where access to electrical power and/or electronic data is desirable. The exposed portion of the electrical or data unit often includes a bezel that is positioned atop or flush with the exposed floor surface, wall surface, or furniture surface to which the unit is mounted. The bezel generally defines an opening through which the unit's electrical power and/or electronic data outlets are made accessible to users in a work area or the like. If a bezel-receiving opening in the exposed surface is not cut or otherwise formed orthogonal (perpendicular) to the plane of the exposed surface, the bezel may not mount straight and flush with the exposed surface, creating an undesirable appearance and possibly a trip hazard or an area where dirt and debris collects. This may be corrected by re-drilling the opening, but re-drilling may result in an oversized bore and the inability to secure the poke-through unit at the bore.

SUMMARY OF THE INVENTION

The present invention provides a poke-through electrical power and/or electronic data unit having an upper bezel that is repositionable relative to a lower housing or insert portion during installation. The upper bezel may be tilted or shifted laterally relative to the lower housing during installation by multiple degrees of freedom permitted by a set of fasteners that non-rigidly couple the lower insert to the upper bezel. By providing an adjustable upper bezel, the configuration or shape of the overall unit may be adjusted to accommodate or account for variations in the position of an opening formed in a bezel-mounting surface relative to another opening or bore that is formed in another surface located behind or below the bezel-mounting surface. Therefore, the bezel can be set flush in its mounting location, even if the orientation of the lower housing or of the opening in which the bezel is mounted is not otherwise conducive to properly orienting the bezel.

According to one form of the present invention, an electrical outlet assembly is provided for mounting in a floor or work surface, and includes an upper bezel and a lower insert that are joined by a plurality of coupling fasteners. The upper bezel provides access to an electrical outlet at the floor or work surface, and there are a plurality of fastener receivers positioned below the upper bezel and coupled to it, either directly or indirectly. The coupling fasteners have respective lower portions received in the lower insert and respective upper portions received at the fastener receivers. At least one end of each coupling fastener is somewhat loosely retained or captured in such a way that when the coupling fasteners are fully secured for coupling the lower insert to the fastener receivers, each of the coupling fasteners is permitted to move axially relative to the fastener receiver or the lower insert. As a result, the lower insert is repositionable in its axial direction relative to the upper bezel and the lower insert is tiltable by a limited amount, such as about three degrees, out of alignment with a longitudinal axis of the upper bezel.

In one aspect, the lower insert defines a plurality of recesses that receive the lower portions of the coupling fasteners, and the lower portions of the coupling fasteners are axially movable within the recesses. Optionally, the lower portions of the coupling fasteners have respective enlarged heads that are captured in the recesses.

In another aspect, the lower insert includes a top plate coupled to an upper surface of a block of intumescent material. The recesses are formed along the upper surface of the intumescent block, and the top plate defines a series of openings aligned with respective recesses. The coupling fastener heads are captured in the recesses by the top plate.

In yet another aspect, the electrical outlet assembly further includes a plurality of sloped channel members extending downwardly below the upper bezel, a securing element slidably mounted at each sloped channel member, and a mounting fastener threaded to each securing element. The mounting fasteners extending upwardly from the respective securing elements and through the sloped channel member. The sloped channel members are angled away from vertical (or from the longitudinal axis of the upper bezel and/or the lower insert) so that the securing elements are moved vertically and radially outwardly upon rotation of the mounting fasteners in one direction, and the securing elements are moved vertically (in the opposite direction) and radially inwardly upon rotation of the mounting fasteners in an opposite direction. Optionally, the securing elements each have a plurality of radially outwardly extending teeth for selectively engaging with an inner surface of a bore in which the assembly is mounted.

In still another aspect, the sloped channel members are sloped inwardly in the radial direction from top to bottom, so that upward movement of the securing elements along the sloped channel members causes the securing elements to move radially outwardly.

In a further aspect, the electrical outlet assembly further includes an outlet housing that supports a plurality of electrical outlets for access at the upper bezel. Optionally, the outlet housing includes the fastener receivers and the sloped channel members.

In a still further aspect, a leaf spring is disposed in a channel formed in an outer periphery of the lower insert. An adjustment screw is coupled to opposite ends of the leaf spring and is configured so that rotation of the adjustment screw draws the spring's opposite ends together to bias a midsection of the leaf spring radially outwardly from the outer periphery of the lower insert.

According to another form of the present invention, an electrical outlet assembly is provided for mounting in a floor or work surface, and includes an upper bezel for providing access to an electrical outlet at the floor or work surface, a lower insert coupled below the upper bezel, and a plurality of sloped channel members coupled to the upper bezel and extending downwardly below the upper bezel. A securing element is slidably mounted or guided in each of the sloped channel members, with a mounting fastener threadedly coupled to each of the securing elements and extending upwardly through the sloped channel member. The sloped channel members are shaped so that when the securing elements are moved vertically in one direction along the channel members, the securing elements also move radially outwardly from the longitudinal bezel axis, such as due to rotation of the mounting fasteners in one direction.

Thus, the poke-through electrical outlet assembly can accommodate variations in mounting bores formed or established in substrates such as concrete or wooden subfloors, allowing an installer to set the upper bezel flush in its mounting location, even if the mounting bore is not perfectly orthogonal to the generally planar surface at which the upper bezel is supported.

These and other objects, advantages, purposes and features of the present invention will become apparent upon review of the following specification in conjunction with the drawings.

DESCRIPTION OF THE PREFERRED EMBODIMENTS

Figure 1:
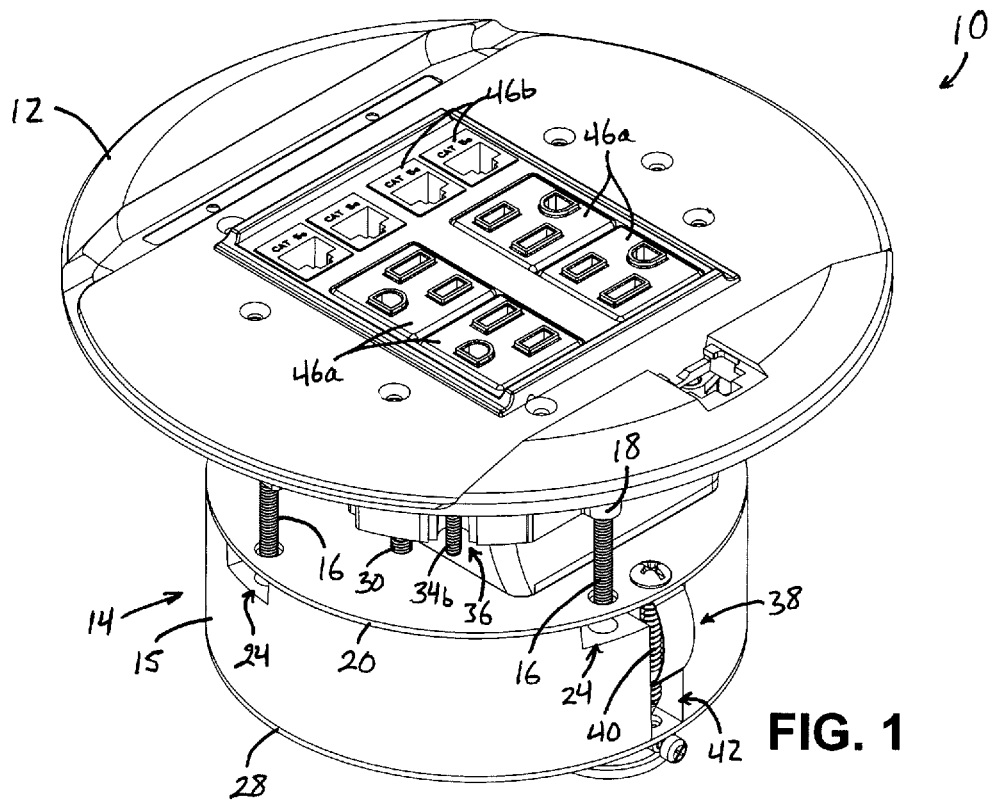
FIG. 1 is a top perspective view of a poke-through electrical power unit with leveling bezel, in accordance with the present invention.

Referring now to the drawings and the illustrative embodiments depicted therein, a poke-through electrical power and/or electronic data unit 10 is configured for mounting in a floor or work surface (FIGS. 1-6). The poke-through unit 10 is designed to permit positional adjustments in orientation and height of an upper bezel 12 relative to a lower insert 14, which includes a fire-resistant block 15 of intumescent material. The ability to make positional adjustments is particularly useful when mounting the upper bezel 12 at an upper opening or bore formed in an exposed surface (such as a raised floor surface, subfloor, or a tabletop), where the upper opening is somewhat misaligned with a corresponding lower opening or bore that is formed in a lower surface (such as true floor or a subfloor below the raised floor, or a table support pedestal), or where the bore is not drilled or otherwise formed perfectly orthogonally relative to the uppermost or outermost surface where the bezel 12 will rest. Thus, the ability to make positional adjustments is also useful when mounting the upper bezel 12 at an upper opening or bore that is not perfectly perpendicular to the surface where the upper bezel 12 rests upon installation. A plurality of spaced-apart fasteners 16 non-rigidly couple the lower insert 14 to the upper bezel 12 in a manner that allows for some adjustment to the spacing between the insert 14 and bezel 12, as well as permitting angular or tilt adjustment of the insert 14 relative to the upper bezel 12 so that their respective longitudinal axes may be set at non-coaxial positions. This permits the poke-through unit 10 to be installed with the upper bezel 12 seated at its mounting surface without gaps or other visible misalignment, even if the lower insert 14 cannot be perfectly aligned with the upper bezel 12 in the chosen mounting location, such as due to a non-orthogonal drilled bore in a concrete floor or other substrate.

Figure 2:
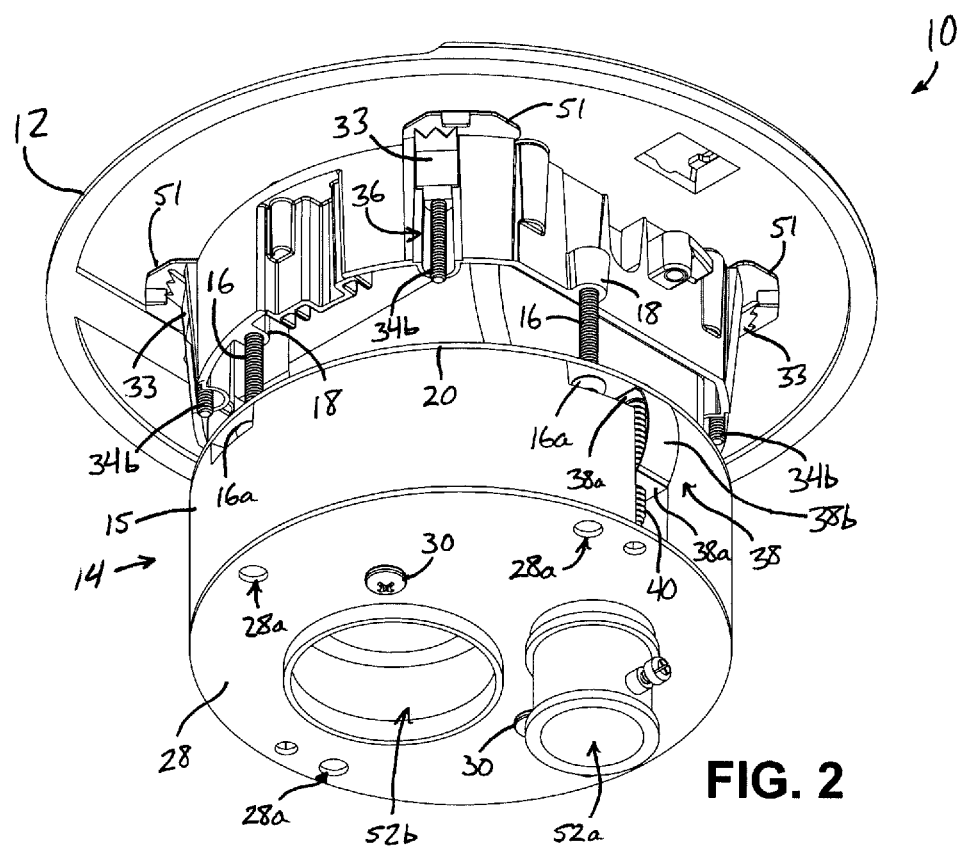
FIG. 2 is a bottom perspective view of the poke-through electrical power unit of FIG. 1.
Figure 3:
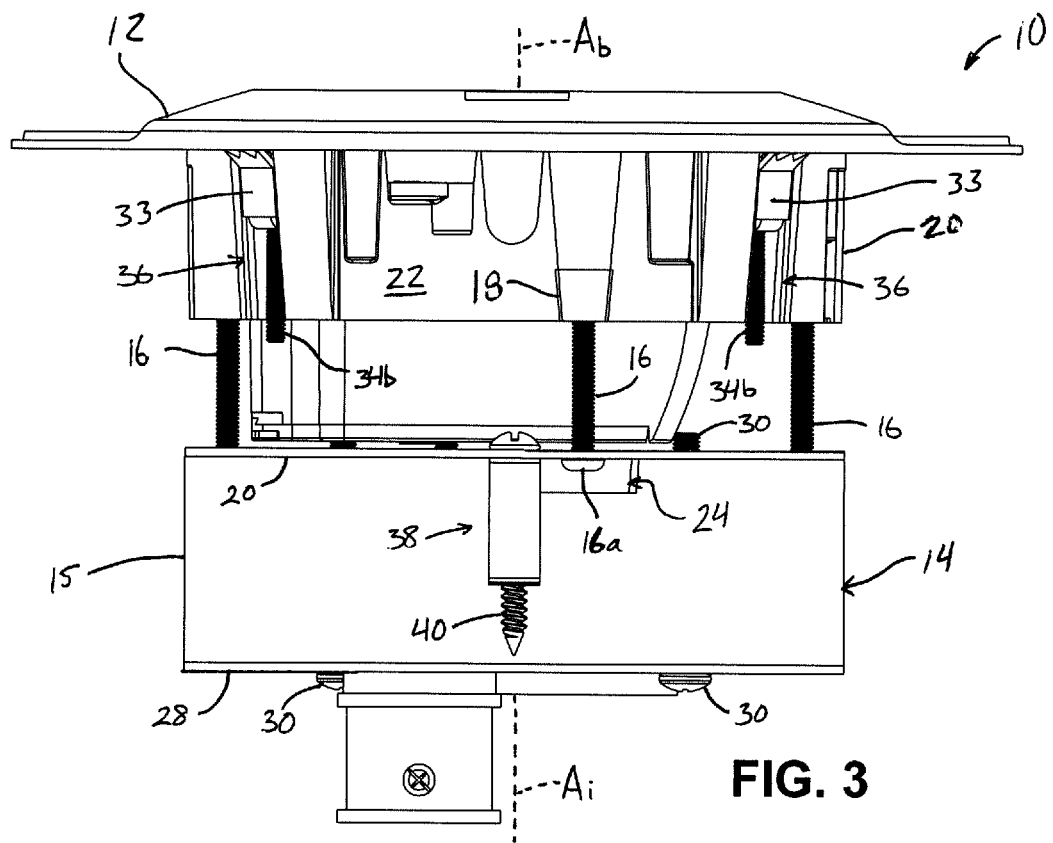
FIG. 3 is a side elevation of the poke-through electrical power unit.
Figure 4:
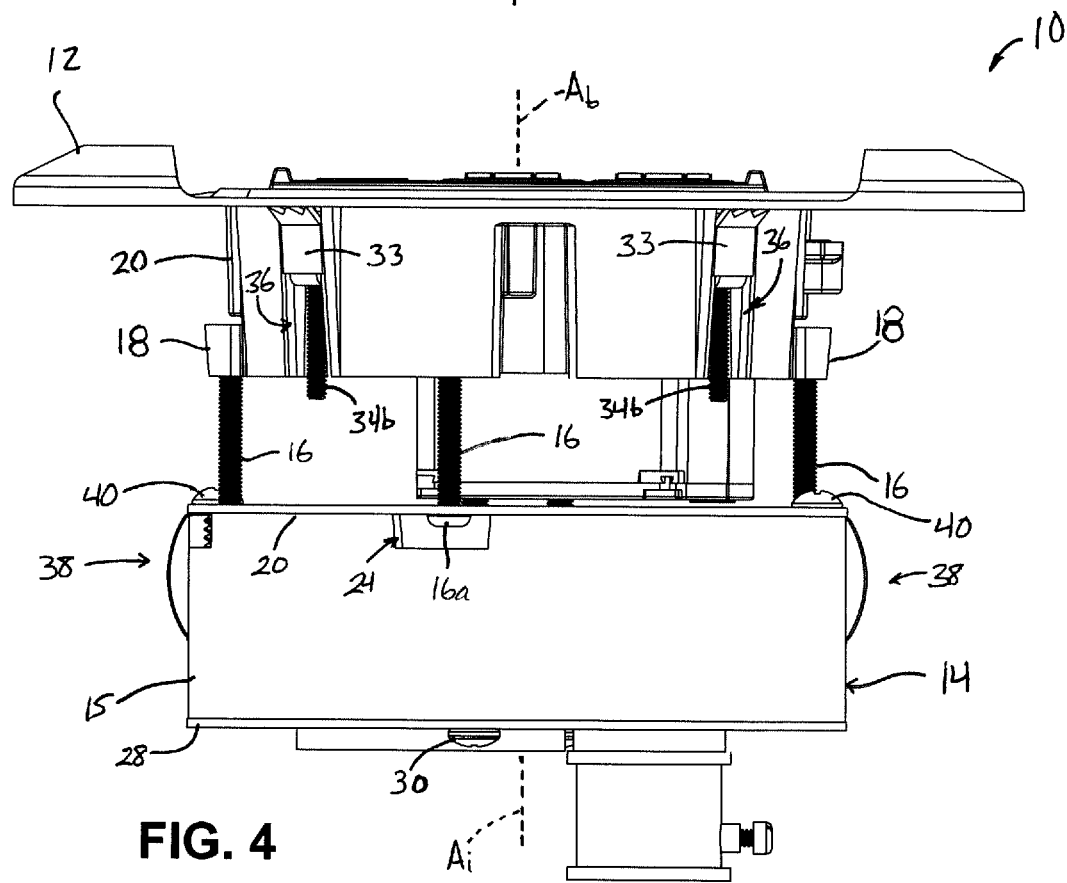
FIG. 4 is another side elevation of the poke-through electrical power unit, shown rotated 90 degrees.
Figure 5:
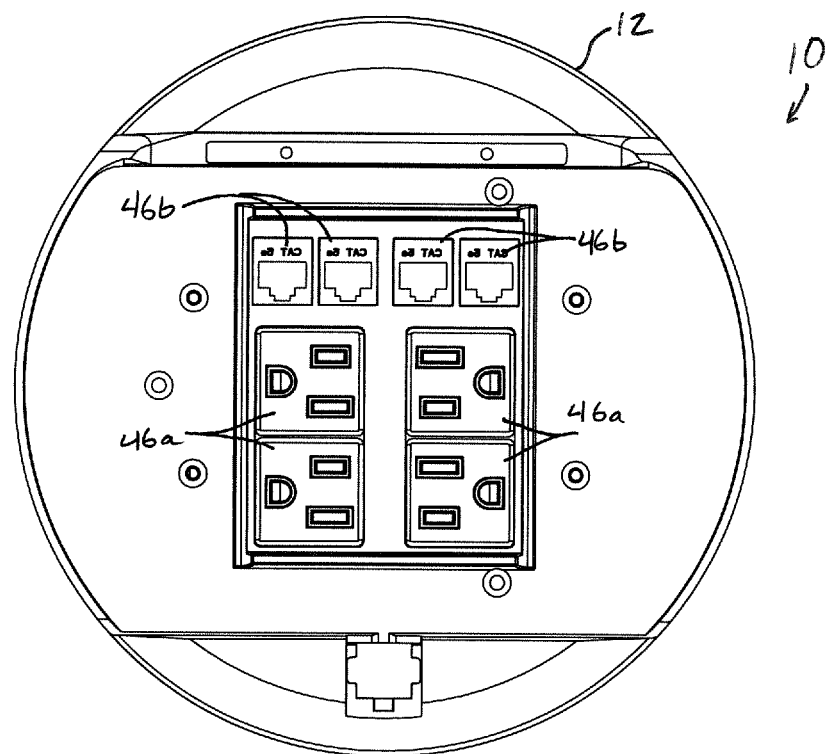
FIG. 5 is a top plan view of the poke-through electrical power unit.

In the illustrated embodiment of FIGS. 1-8, upper bezel 12 is generally disc-shaped and defines one or more through-openings for providing access to electrical power and/or electronic data outlets or receptacles. The upper bezel 12 is substantially planar, although different thickness regions, beveled edges, surface textures, and minor undulations are possible. The upper bezel 12 has a longitudinal bezel axis $A_b$ that is orthogonal (perpendicular) to a plane in which the disc-shaped upper bezel substantially lies (FIGS. 3 and 4). When the upper bezel 12 has a circular shape as shown, bezel axis $A_b$ passes through the center of the bezel as viewed from above or below. However, other shapes of bezels are equally possible, such as square or rectangular bezels, and in each case the longitudinal bezel axis can be said to pass orthogonally through a center of the bezel as viewed from above or below.

Lower insert 14 is generally cylindrical in shape as shown in FIG. 1, and has an outer diameter that is somewhat less than the outer diameter of the upper bezel 12, although this relative sizing is not necessarily required. With upper bezel 12 having a greater diameter than that of the lower insert 14, the lower insert 14 can easily pass through an opening formed in an exposed surface and then into another opening or bore, of the same or smaller size, formed below or behind the exposed surface, while the bezel 12 may be sized to rest atop the exposed surface without passing through the opening formed therein. The lower insert 14 has a longitudinal insert axis $A_i$ that passes through the center of its generally cylindrical shape, and that would typically be coaxial with the longitudinal bezel axis $A_b$ when the lower insert 14 is perfectly aligned with the upper bezel 12, such as shown in FIGS. 3 and 4. Like the upper bezel, the lower insert can take many different shapes, and is not necessarily limited to the cylindrical shape of the illustrated embodiment of FIG. 1.

Figure 7:
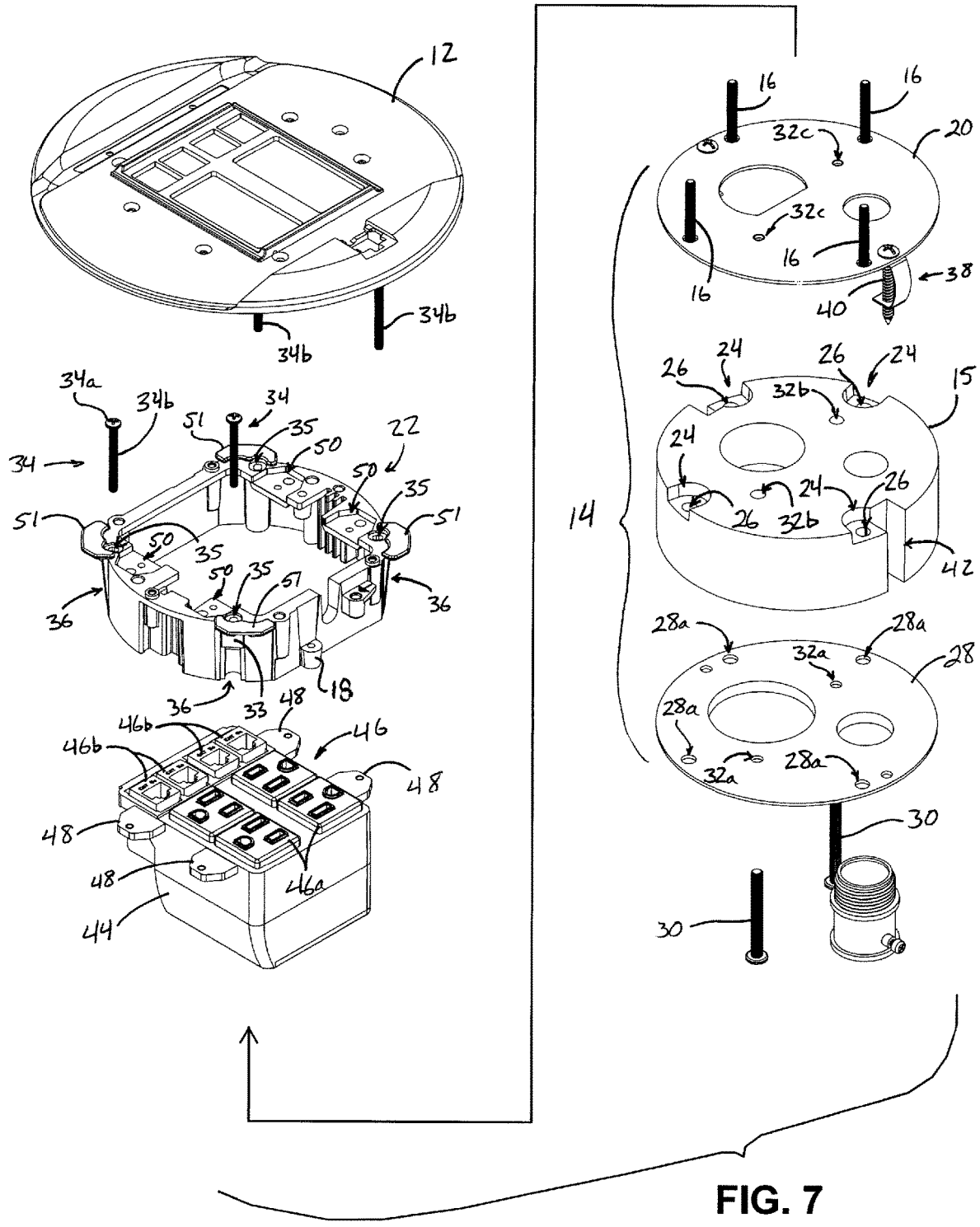
FIG. 7 is an exploded top perspective view of the poke-through electrical power unit.
Figure 8:
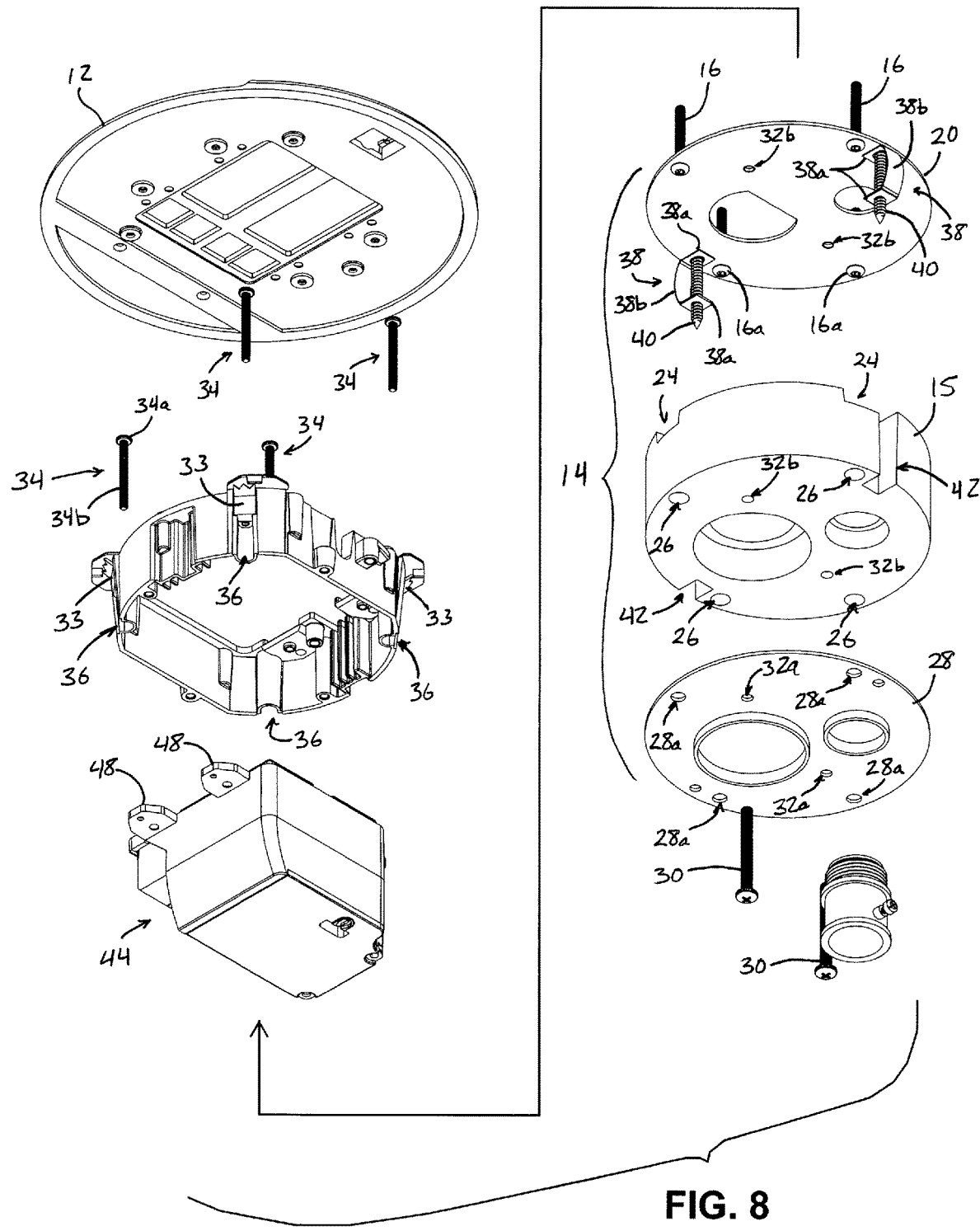
FIG. 8 is an exploded bottom perspective view of the poke-through electrical power unit.
Figure 9:
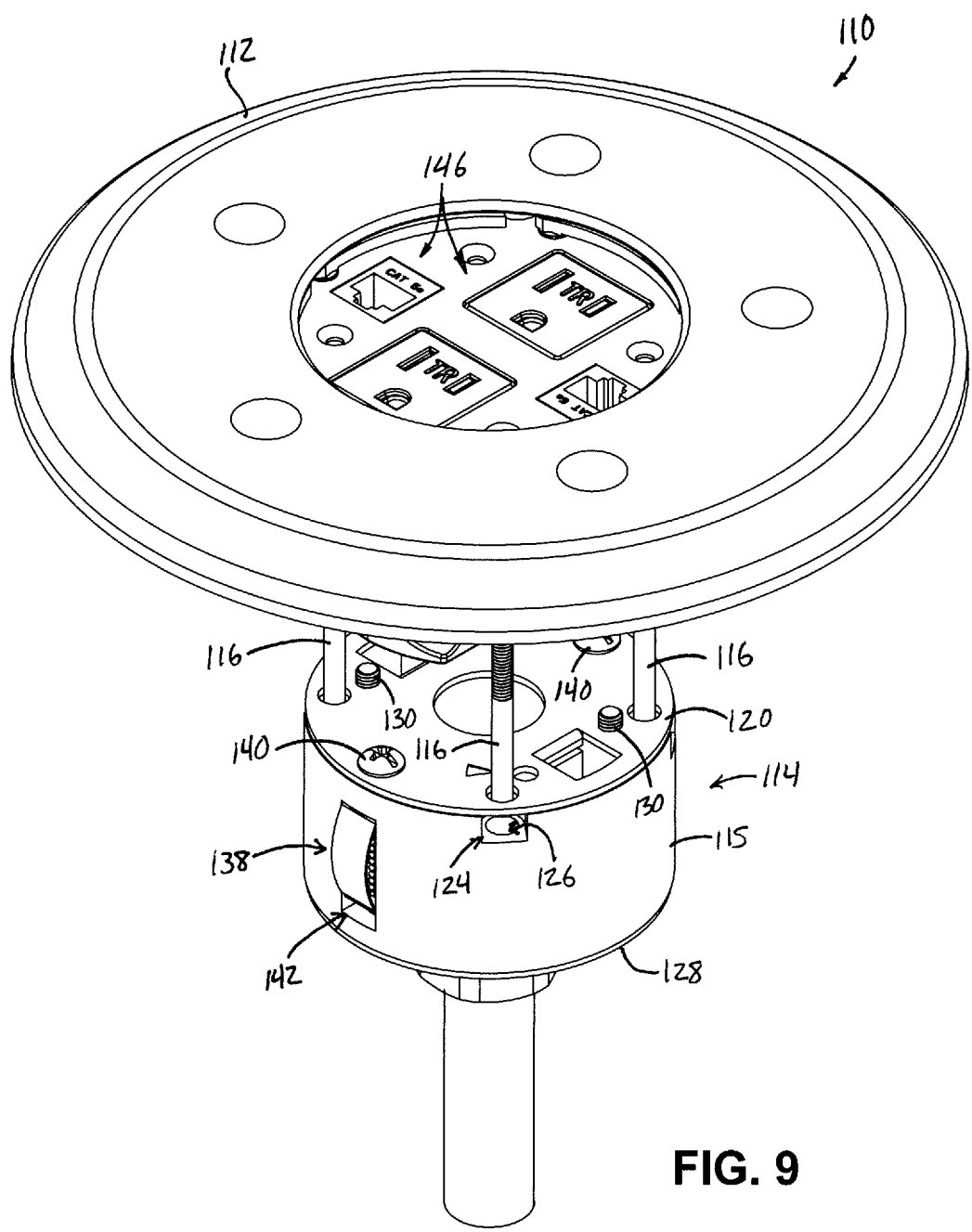
FIG. 9 is a top perspective view of another poke-through electrical power unit with leveling bezel, in accordance with the present invention.

Each coupling fastener 16 is located at a respective location that is spaced radially outwardly from both the longitudinal bezel axis $A_b$ and the longitudinal insert axis $A_i$, and that is spaced circumferentially apart from the other fasteners. It is envisioned that all of the fastener locations would typically be spaced the same or similar radial distance (radius) from the axes $A_b$ and $A_i$, but somewhat different spacings (radial and circumferential) are possible for each fastener location, such as to accommodate (provide clearance for) certain arrangements of electrical power or electronic data outlets, or to accommodate other structures in the vicinity. In the illustrated embodiment, and as best shown in FIGS. 7 and 8, the four coupling fasteners 16 are arranged at equal radial spacings, but unequal circumferential spacings, to provide clearance for other structures.

Figure 6:
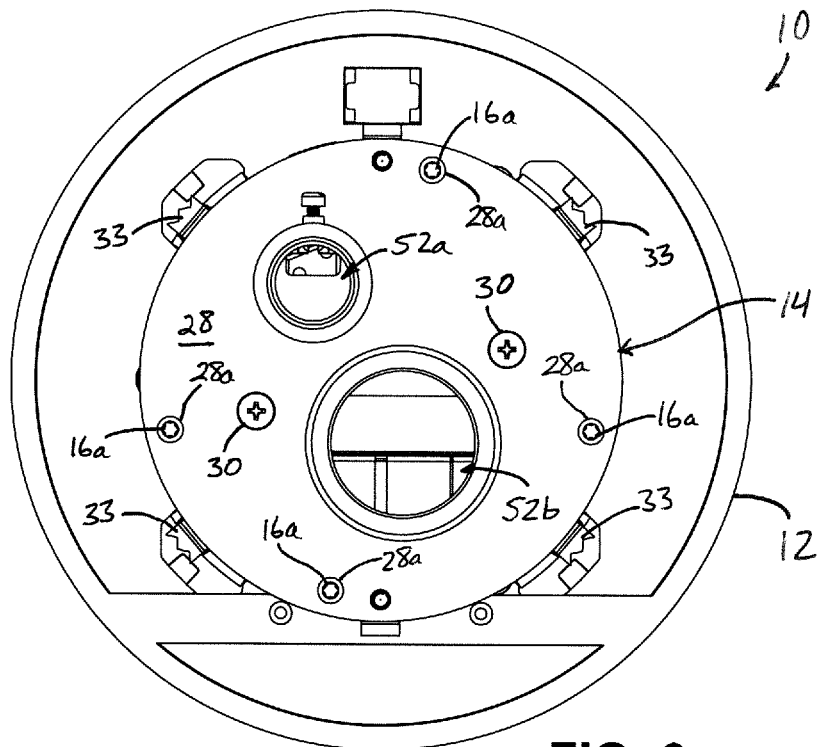
FIG. 6 is a bottom plan view of the poke-through electrical power unit.

Each coupling fastener 16 includes a threaded shaft that extends upwardly through a top plate 20 of the lower insert 14, and threadedly engages a corresponding female threaded support 18 that is formed in an outer outlet housing 22 that is secured to an underside of the upper bezel 12 (FIGS. 2-4). The coupling fasteners 16 have respective heads 16a positioned at an underside of the top plate 20, with respective recesses 24 formed in an upper region of the fire-resistant block 15 to provide clearance for the fastener heads 16a, as will be described in more detail below. A plurality of bores 26 are formed through the fire-resistant block 15, aligned with the recesses 24 and the coupling fasteners 16 (FIGS. 7 and 8). The bores 26 provide access to the fastener heads 16a from below with a narrow tool, such as a screwdriver shaft. The bores 26 are accessed from below through respective openings 28a that are formed in a bottom plate 28 of the lower insert 14, such as shown in FIG. 6. The bottom plate 28 cooperates with the fire-resistant block 15 and the top plate 20 to form the lower insert 14. Bottom plate 28 is secured to the top plate 20 by a pair of threaded fasteners 30, with the fire-resistant block 15 sandwiched in between (FIGS. 1-4). Fasteners 30 pass through respective pair of openings or bores 32a, 32b, 32c in the bottom plate 28, block 15, and top plate 20, with the bores 32c of the top plate 20 being threaded to permit securing and tightening the fasteners 30 (FIGS. 7 and 8).

The recesses 24 at the top of the fire-resistant block 15 are recessed a sufficient distance from the top plate 20 so that the lower insert 14 can "float" up or down relative to the outer outlet housing 22, and can be set at an angle relative to the outer outlet housing 22. For example, in the illustrated embodiment when the coupling fasteners 16 are fully secured for coupling the lower insert 14 to the fastener receivers 18, the fastener heads 16a can move freely up and down within the respective recesses 24, between the top plate 20 and the bottom of each recess 24, such that the longitudinal insert axis $A_i$ may be misaligned with the longitudinal bezel axis $A_b$ by up to about 3 to 4 degrees. As a result, the lower insert 14 is also repositionable in its axial direction (along insert axis $A_i$) relative to the upper bezel 12 by a limited distance according to the vertical spaces between the fastener heads 16a and the bottom surfaces of the respective recesses 24. In this way, the bore in which the poke-through unit 10 is mounted may be non-orthogonal with the upper floor surface by up to 3 to 4 degrees, while still permitting the bottom surface of the upper bezel 12 to lie flush against the upper floor surface.

It will be appreciated that adjusting the depths of the recesses 24, the dimensions or shapes of the fastener heads 16a would permit different ranges of angular and vertical adjustment of the lower insert 14 relative to the outer outlet housing 22, as desired or needed during installation into a somewhat non-orthogonal bore. It should further be appreciated that the same or similar effect may be achieved by reversing the orientation of the coupling fasteners 16 and configuring the support at the outer outlet housing to provide a recess or cavity in which each fastener head is relatively free to move, while the opposite end of each fastener is more rigidly secured. Moreover, it is envisioned that double-headed studs may be used in place of the more traditional single-headed fasteners shown, with receiving cavities provided for loosely capturing both ends of the double-headed stud.

A set of four threaded mounting fasteners 34 and corresponding toothed securing elements 33 (FIGS. 2-4, 7, and 8) are used to secure the poke-through unit 10 in a bore. Mounting fasteners 34 have head portions 34a that rest atop the outer outlet housing 22 at respective bores 35 (FIG. 7), with threaded shaft portions 34b extending downwardly into respective sloped channels 36 arranged along an outer periphery of the outer outlet housing 22. The toothed securing elements 33 have inboard portions that are sized and shaped to slide up and down along the respective channels 36, and that define threaded bores for receiving the respective threaded shafts 34b of the fasteners. In this way, the toothed securing elements 33 can be moved up and down the channels 36 by rotating the mounting fasteners 34 with a tool. Because the channels are sloped radially outward from bottom to top, moving a securing element 33 from bottom to top of the corresponding channel 36 forces the securing element 33 radially outwardly and into increasingly firmer engagement with the surface (typically cylindrical) that defines the bore in which the outer outlet housing 22 and lower insert 14 are received during installation. As the teeth of the toothed securing elements 33 engage the bore surface due to tightening of the mounting fasteners 34, the upward movement of the securing elements 33 will force the outlet housing 22 (and attached upper bezel 12) downward into engagement with the exposed surface where the upper bezel 12 will be supported (such as a raised floor or tabletop), and secures the whole assembly against removal from the bore. If removal of the poke-through unit 10 is desired, the mounting fasteners 34 are loosened to force the toothed securing elements 33 down their respective channels 36 and out of engagement with the bore surface. The fastener heads 34a may be accessed when the upper bezel 12 is removed. The upper bezel 12 is attachable to the outlet housing 22 using separate fasteners (not shown) once the outer outlet housing 22 is secured with the toothed securing elements 33.

The lower insert 14 may be frictionally held in the bore by a pair of adjustable generally C-shaped leaf springs 38 having inboard top and bottom ends 38a mounted on respective adjustment screws 40 and received in respective channels 42 formed in the outer periphery of the fire-resistant block 15 (FIGS. 1-4, 7, and 8). The leaf springs 38 include bowed midsections 38b that extend radially outwardly in response to tightening of the adjustment screws 40, which forces the top and bottom ends 38a closer together. The outward bowing of the midsections 38b increases their frictional engagement with the bore surface, which friction can be reduced by loosening the adjustment screws 40 to cause the midsections 38b to move radially inwardly toward the respective channels 42. Thus, the leaf springs 38 can be adjusted to provide a snug fit of the lower insert 14 in the bore so that the insert 14 will not fall through the bore if inserted by itself, while permitting the lower insert 14 to be removed by overcoming the frictional engagement of the springs' midsections 38b with the bore, which is made easier by loosening the adjustment screws 40.

The poke-through unit 10 further includes an inner outlet housing 44 (FIGS. 7 and 8) in which a plurality of outlets or receptacles 46 are mounted together as a unit for simplified installation. In the illustrated embodiment, the receptacles 46 include four high voltage 110V AC simplex receptacles 46a and four CAT-5 data jacks 46b (FIGS. 1, 5, and 7), but it will be appreciated that substantially any number, type, and arrangement of power and/or data connectors may be used without departing from the spirit and scope of the present invention. It should be understood that the general terms "electrical outlet" and "electrical receptacle" are used herein to refer to substantially any type of electrical power outlet or receptacle connector, as well as any type of electronic data outlet or receptacle connector, unless otherwise stated. The inner outlet housing 44 includes four outwardly-extending mounting tabs 48 at its upper end, which are received (from above) by four corresponding recesses 50 formed at the upper end of the outer outlet housing 22 (FIG. 7), where they are secured with fasteners (not shown). Once the inner outlet housing 44 is secured to the outer outlet housing 22, they may be handled together as a unit and secured to the upper bezel 12 using additional fasteners (not shown) that extend through the upper bezel 12 and are received in respective threaded bores of the outer outlet housing 22. The outer outlet housing 22 further includes a set of upper flanges 51 that are sized to rest atop a surface (such as a floor surface) in which the bore is formed for receiving the outlet housing 22 and the lower insert 14. Respective high voltage AC power cords and low voltage or electronic data cords (not shown) for the receptacles 46 are routed into the inner outlet housing 44 through a lower end thereof, and out through the lower insert 14 via respective through-openings 52a, 52b.

The poke-through unit 10 may be mounted in a bore, typically formed in a floor such as a wooden or concrete floor, by first inserting the lower insert 14 and the outer outlet housing 22 into the bore. If needed, the adjustment screws 40 may be adjusted to achieve a desired frictional engagement of the leaf springs 38 with the bore's inner surface. As the outer outlet housing 22 is pressed downwardly into the bore, the fastener heads 16a are repositioned within their respective recesses 24 according to any limited non-orthogonal orientation of the bore relative to the floor surface. This allows the upper flanges 51 of the outer outlet housing 22 to lie flush against the floor surface, so that the upper bezel 12 can be secured to the outlet housing 22 and also set flush to the floor surface. As a result, once the necessary bore is formed in the floor and the appropriate wiring has been run to the bore, the installation of the poke-through unit 10 requires only the insertion of the outer outlet housing 22 and lower insert 14 into the bore until the outlet housing's upper flanges 51 are all resting on the floor surface, tightening the outlet housing 22 in the bore by turning the mounting fasteners 34 until the toothed securing elements 33 tightly engage the inner surface of the bore, and then securing the upper bezel 12 to the outlet housing 22.

Referring now to FIGS. 9-16, another poke-through unit 110 is disclosed which is similar to the above-described poke-through unit 10 with respect to its lower structures used for mounting in a bore formed in a floor or other surface. As such, similar or corresponding structures of the poke-through unit 110 are numbered the same as like structures of the earlier-described poke-through unit 10 with the addition of 100, such that those structures may be understood with reference to the above descriptions, and a full description of the various components of the poke-through unit 110 will not be repeated herein. Instead, the following description focuses on the different manner in which the other poke-through unit 110 is secured in a bore.

In the case of the poke-through unit 110 of FIGS. 9-16, each fastener 116 includes a threaded shaft that extends upwardly from the top plate 120 and threadedly engages a female threaded support 118 that extends downwardly from the upper bezel 112. Female threaded supports 118 may be unitarily formed with upper bezel 112. The upper bezel 112 is coupled to the lower insert 114 only by engagement of the threaded coupling fasteners 116 with the female threaded supports 118. However, it will be appreciated that other couplings between the upper bezel 12 and lower housing 14 may be provided, as long as those other couplings can permit positional adjustments of the upper bezel relative to the lower housing.

Female threaded supports 118 include outboard flange portions 160 that are configured to receive respective metal spring-clips 162 having respective outwardly-extending upper legs 162a. The outwardly-extending upper legs 162a are configured to engage an inwardly-facing surface (such as a cylindrical bore surface) located below or behind the exposed surface where the bezel 112 will be supported. Unlike the toothed securing elements 33 of the poke-through unit 10, the spring-clips 162 are statically mounted and do not move relative to the flange portions 160. Instead, the outwardly-extending upper legs 162a extend radially outwardly further than the diameter of the bore in which the unit 110 is to be inserted, the legs 162a flexing radially inwardly during insertion and then resisting any pullout forces due to the tips of the upper legs 162a engaging the bore surface. Once the bottom surface of the upper bezel 112 is fully pressed against the floor surface surrounding the bore, it is automatically secured in position by the spring-clips 162. Although this securing arrangement of spring-clips 162 and flange portions 160 has some advantages, such as lower cost and fewer installation steps, removal of the installed poke-through unit 110 may destroy at least the spring-clips 162 and also risks damage to the upper bezel 112. By comparison, the earlier-described poke-through unit 10 with toothed securing elements 33 can be secured at the bore and removed from the bore repeatedly without damage.

Figure 10:
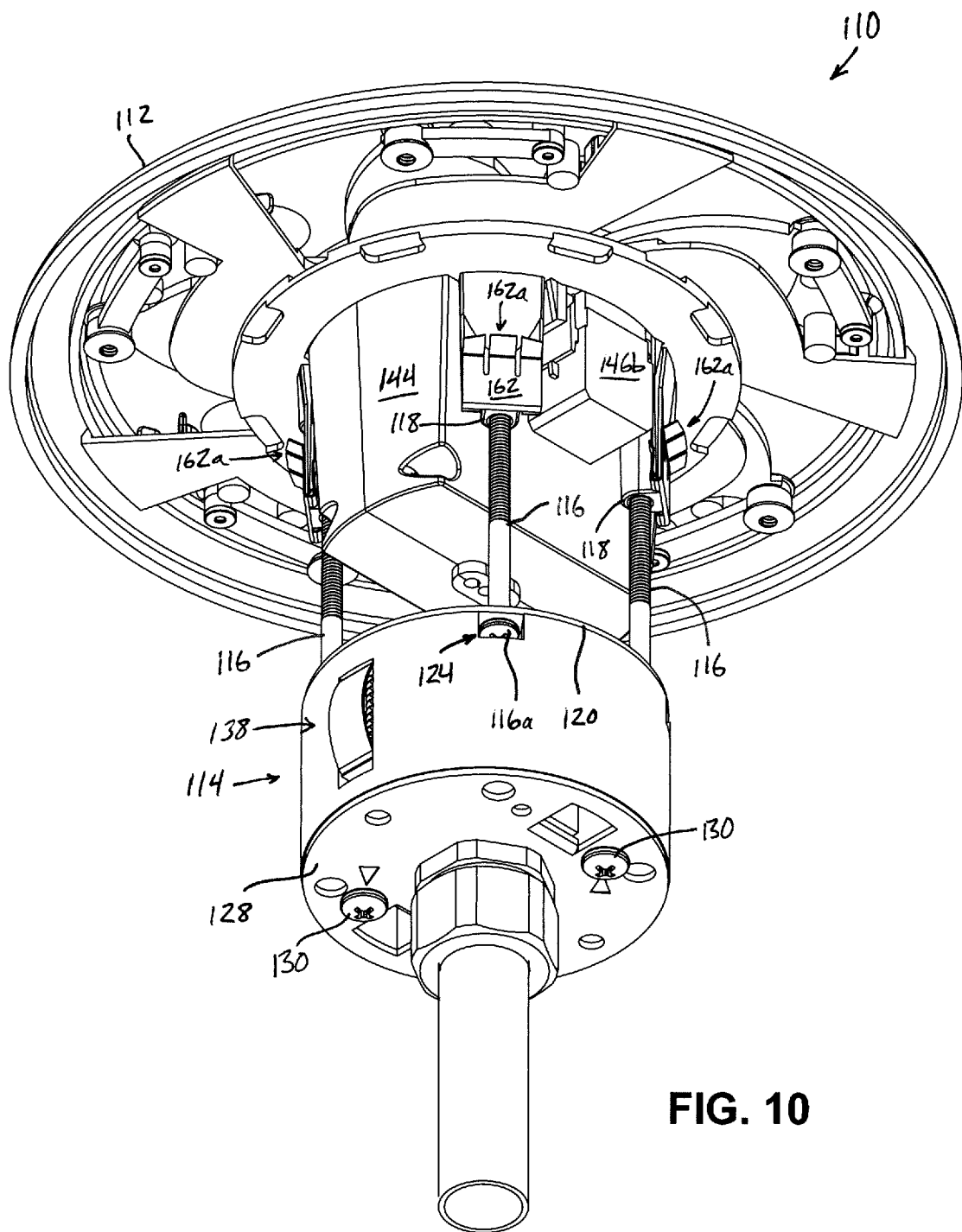
FIG. 10 is a bottom perspective view of the poke-through electrical power unit of FIG. 9.
Figure 11:
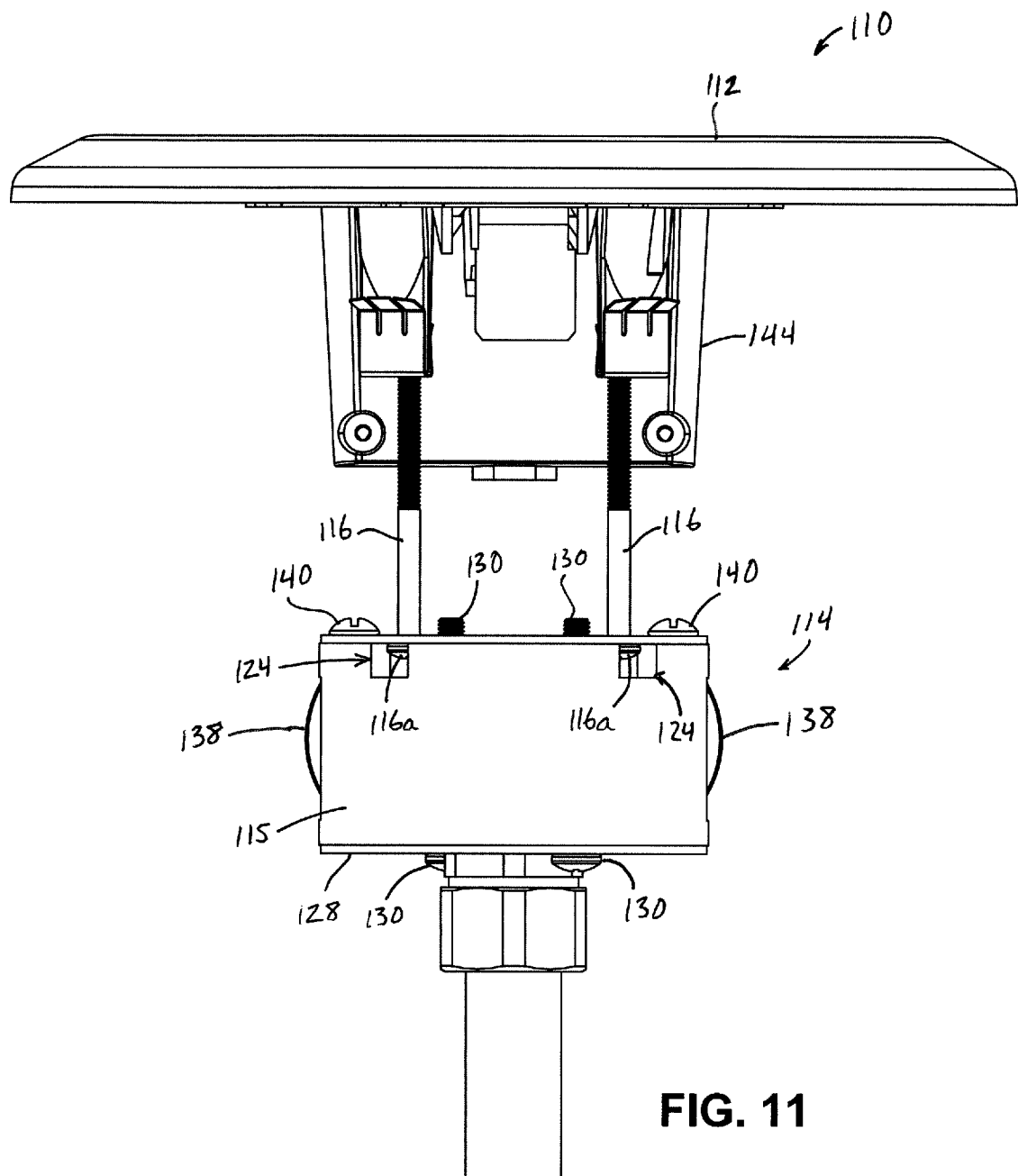
FIG. 11 is a side elevation of the poke-through electrical power unit of FIG. 9.
Figure 12:
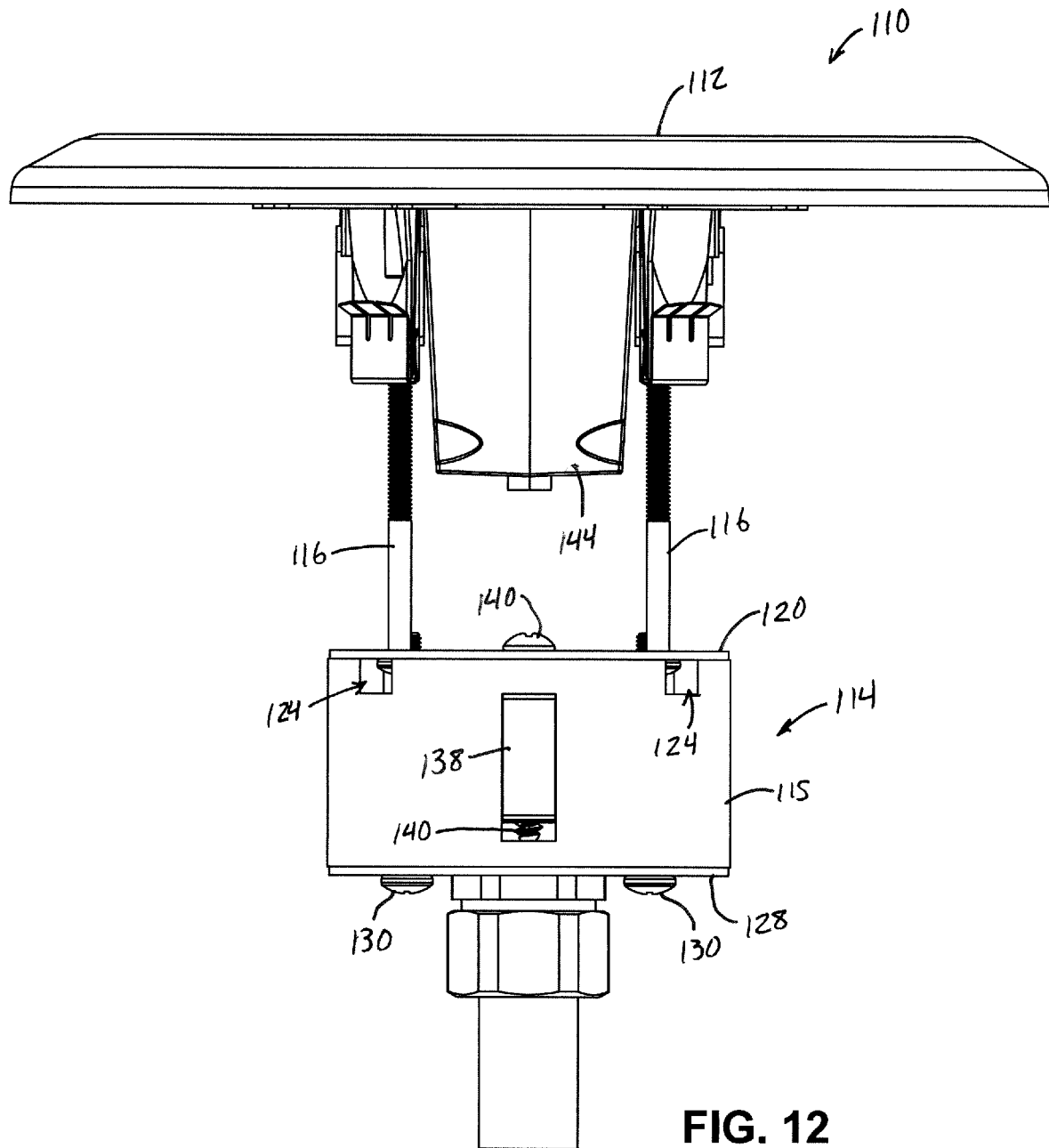
FIG. 12 is another side elevation of the poke-through electrical power unit of FIG. 9, shown rotated 90 degrees.
Figure 13:
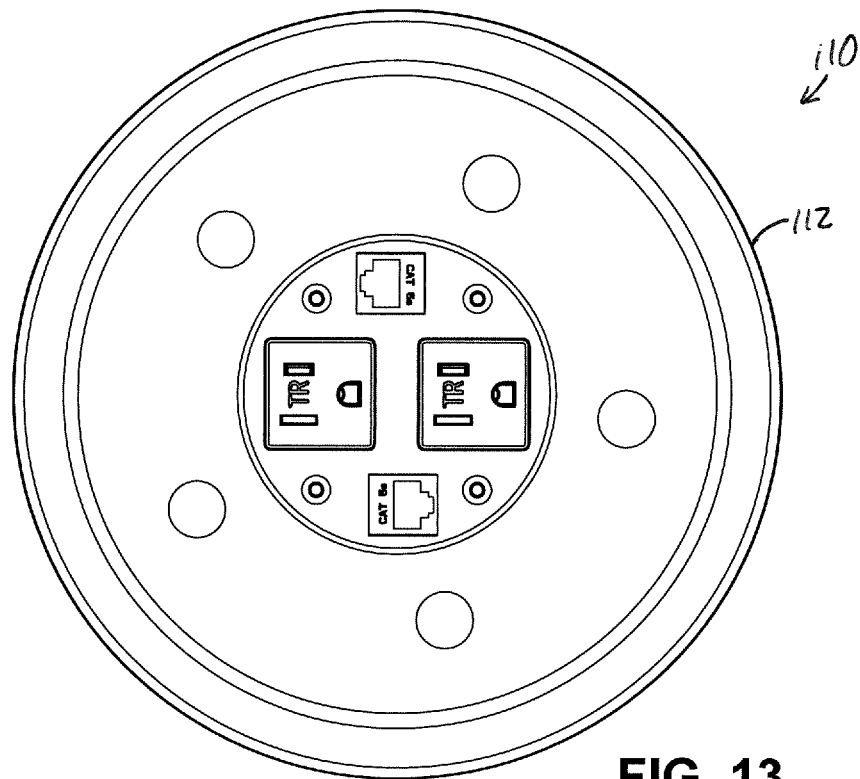
FIG. 13 is a top plan view of the poke-through electrical power unit of FIG. 9.
Figure 14:
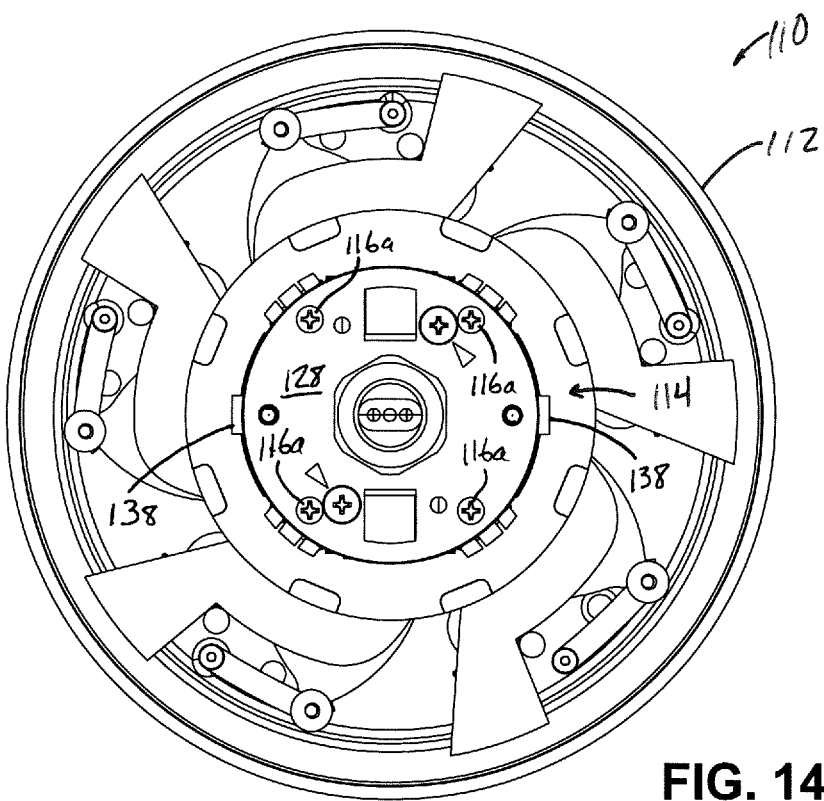
FIG. 14 is a bottom plan view of the poke-through electrical power unit of FIG. 9.
Figure 15:
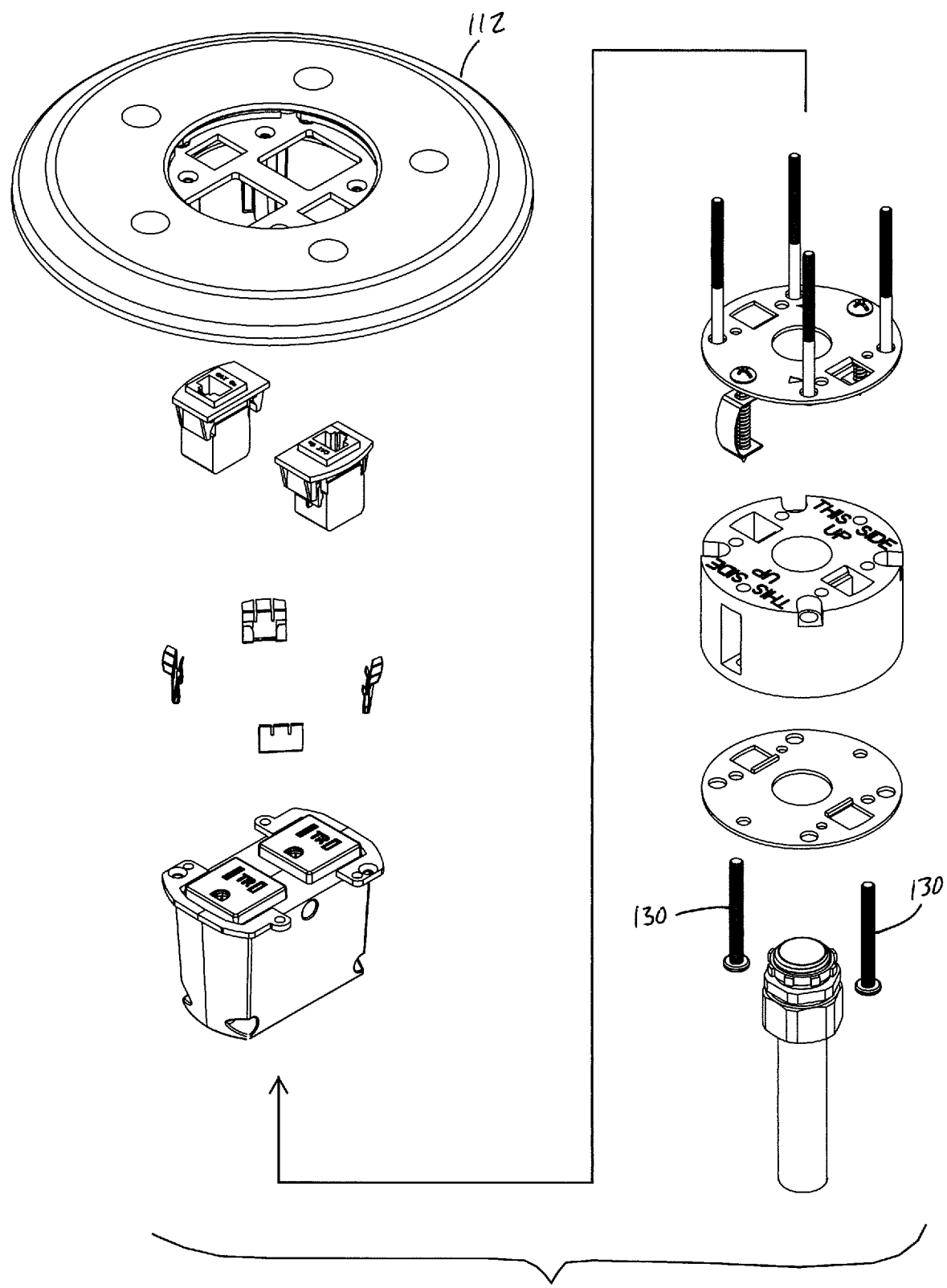
FIG. 15 is an exploded top perspective view of the poke-through electrical power unit of FIG. 9.
Figure 16:
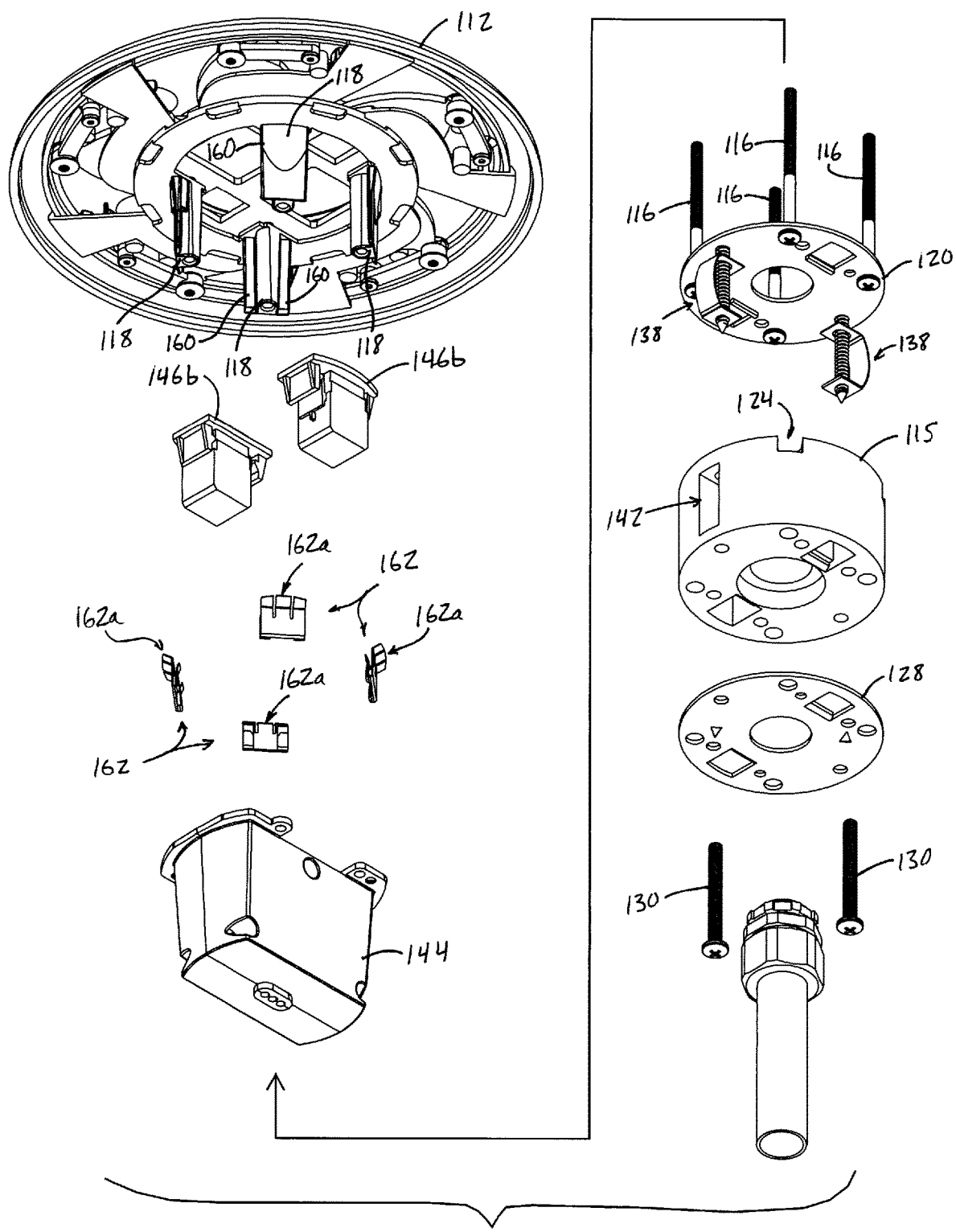
FIG. 16 is an exploded bottom perspective view of the poke-through electrical power unit of FIG. 9.

In other respects that correspond to the insertion and securing of the poke-through unit 110 in a bore, the poke-through unit 110 is substantially similar to the unit 10 described above, including the use of leaf springs 138 with adjustment screws 140, and recesses 124 in the fire-resistant block 115 that permit "floating" movement of the threaded fastener heads 116a to accommodate a slightly non-orthogonal bore formed in a floor where the unit 110 is to be mounted. As seen in FIGS. 10, 14, and 16, the upper bezel 112 has an iris-type closure mechanism that permits rotation of a portion of the bezel to selectively block or un-block access to outlets 146 (FIGS. 9, 13, and 15), which is more fully described in co-pending and commonly-owned U.S. provisional application Ser. No. 62/718,377, filed Aug. 13, 2018, and the application(s) claiming priority therefrom, the disclosures of which are hereby incorporated herein by reference.

Thus, it will be appreciated that the coupling fasteners 16, 116 with respective heads 16a, 116a movably positioned within respective recesses 24, 124 will permit at least limited lateral and angular shifting of the upper bezel 12, 112 relative to the lower insert 14, 14. Such movements are permitted by pivoting of the lower insert 14, 114 relative to the threaded shafts 16, 116. This adjustability, particularly when combined with adjustable leaf springs 38, 138 that frictionally engage the mounting bore and can accommodate at least minor variations in bore diameter and orientation, permits the poke-through units 10, 110 to be easily installed in floors or other solid surfaces, with the upper bezels 12, 112 mounted flush against the floor surface even when the mounting bores are not perfectly formed.

Changes and modifications in the specifically-described embodiments may be carried out without departing from the principles of the present invention, which is intended to be limited only by the scope of the appended claims as interpreted according to the principles of patent law including the doctrine of equivalents.

The embodiments of the invention in which an exclusive property or privilege is claimed are defined as follows:

1. An electrical outlet assembly for mounting in a floor or work surface, said unit comprising:
   an upper bezel defining a longitudinal bezel axis;
   a plurality of fastener receivers positioned below said upper bezel;
   a lower insert spaced below said upper bezel and having a longitudinal insert axis,
   wherein said lower insert is positionable with the longitudinal insert axis in parallel or coaxial alignment with the longitudinal bezel axis,
   said lower insert defining a plurality of recesses;
   a plurality of coupling fasteners having lower portions received in respective ones of said recesses,
   and upper portions extending above said lower insert and secured at respective ones of said fastener receivers;
   a plurality of sloped channel members coupled to said upper bezel and extending downwardly therefrom;
   a securing element slidably disposed in each of said sloped channel members; and
   a mounting fastener threadedly coupled to each of said securing elements and extending upwardly through said sloped channel member;
   wherein said lower portions of said coupling fasteners are axially movable within said recesses to permit said lower insert to move a limited distance along the longitudinal insert axis;
   wherein said lower insert is tiltable relative to said upper bezel with the longitudinal insert axis oriented in non-parallel alignment with the longitudinal bezel axis in response to positioning of said fastener receivers at different positions along respective ones of said coupling fasteners; and
   wherein said sloped channel members are configured so that said securing elements are moved vertically and radially outwardly from said longitudinal bezel axis upon rotation of said mounting fasteners in one direction,
   and said securing elements are moved vertically and radially inwardly from said longitudinal bezel axis upon rotation of said mounting fasteners in an opposite direction.

2. The electrical outlet assembly of claim 1, wherein said lower portions of said coupling fasteners comprise respective heads having larger diameters than said upper portions of said coupling fasteners.

3. The electrical outlet assembly of claim 2, wherein said lower insert comprises a top plate coupled to an upper surface of a block,
   wherein said recesses are formed along said upper surface of said block,
   and wherein said top plate defines a plurality of openings aligned with respective ones of said recesses, with said coupling fastener heads captured in said recesses by said top plate.

4. The electrical outlet assembly of claim 3, wherein said block comprises an intumescent material.

5. The electrical outlet assembly of claim 1, further comprising an outlet housing configured to support a plurality of electrical outlets for access at said upper bezel,
   wherein said outlet housing comprises said fastener receivers and said sloped channel members.

6. The electrical outlet assembly of claim 5, wherein said sloped channel members are sloped inwardly in the radial direction from top to bottom so that upward movement of said securing elements along said sloped channel members causes said securing elements to move radially outwardly.

7. The electrical outlet assembly of claim 1, wherein said securing elements each comprise a plurality of radially outwardly extending teeth configured for selective engagement with an inner surface of a bore.

8. The electrical outlet assembly of claim 1, further comprising an outlet housing configured to support a plurality of electrical outlets for access at said upper bezel,
   wherein said outlet housing comprises said fastener receivers.

9. The electrical outlet assembly of claim 1, further comprising a leaf spring disposed in a channel formed in an outer periphery of said lower insert,
   and an adjustment screw coupled to opposite ends of said leaf spring,
   wherein rotation of said adjustment screw biases a midsection of said leaf spring radially outwardly from said outer periphery of said lower insert.

10. An electrical outlet assembly for mounting in a floor or work surface, said assembly comprising:
    an upper bezel for providing access to an electrical outlet at the floor or work surface;
    a plurality of fastener receivers positioned below and coupled to said upper bezel;
    a lower insert spaced below said upper bezel;
    a plurality of coupling fasteners having respective lower portions received in said lower insert and respective upper portions received at said fastener receivers;
    a plurality of sloped channel members coupled to said upper bezel and extending downwardly therefrom;
    a securing element slidably disposed in each of said sloped channel members; and
    a mounting fastener threadedly coupled to each of said securing elements and extending upwardly through said sloped channel member;
    wherein when said coupling fasteners are fully secured for coupling said lower insert to said fastener receivers,
    each of said coupling fasteners is permitted to move axially relative to said fastener receiver or said lower insert such that said lower insert is repositionable in its axial direction relative to said upper bezel
    and said lower insert is tiltable by at least three degrees out of alignment with a longitudinal axis of said upper bezel; and
    wherein said sloped channel members are configured so that said securing elements are moved vertically and radially outwardly from said longitudinal bezel axis upon rotation of said mounting fasteners in one direction,
    and said securing elements are moved vertically and radially inwardly from said longitudinal bezel axis upon rotation of said mounting fasteners in an opposite direction.

11. The electrical outlet assembly of claim 10, wherein said lower insert defines a plurality of recesses that receive said lower portions of said coupling fasteners, wherein said lower portions of said coupling fasteners are axially movable within said recesses.

12. The electrical outlet assembly of claim 11, wherein said lower portions of said coupling fasteners comprise respective heads having larger diameters than said upper portions of said coupling fasteners.

13. The electrical outlet assembly of claim 11, wherein said lower insert comprises a top plate coupled to an upper surface of a block,
   wherein said recesses are formed along said upper surface of said block,
   and wherein said top plate defines a plurality of openings aligned with respective ones of said recesses, with said coupling fastener heads captured in said recesses by said top plate.

14. The electrical outlet assembly of claim 13, wherein said block comprises an intumescent material.

15. The electrical outlet assembly of claim 10, further comprising an outlet housing configured to support a plurality of electrical outlets for access at said upper bezel,
   wherein said outlet housing comprises said fastener receivers and said sloped channel members.

16. The electrical outlet assembly of claim 15, wherein said sloped channel members are sloped inwardly in the radial direction from top to bottom so that upward movement of said securing elements along said sloped channel members causes said securing elements to move radially outwardly.

17. The electrical outlet assembly of claim 10, wherein said securing elements each comprise a plurality of radially outwardly extending teeth configured for selective engagement with an inner surface of a bore.

18. An electrical outlet assembly for mounting in a floor or work surface, said assembly comprising:
   an upper bezel for providing access to an electrical outlet at the floor or work surface;
   a lower insert spaced below and coupled to said upper bezel;
   a plurality of sloped channel members coupled to said upper bezel and extending downwardly therefrom;
   a securing element slidably disposed in each of said sloped channel members; and
   a mounting fastener threadedly coupled to each of said securing elements and extending upwardly through said sloped channel member;
   wherein said sloped channel members are configured so that said securing elements are moved vertically and radially outwardly from said longitudinal bezel axis upon rotation of said mounting fasteners in one direction,
   and said securing elements are moved vertically and radially inwardly from said longitudinal bezel axis upon rotation of said mounting fasteners in an opposite direction; and
   wherein said securing elements each comprise at least one radially outwardly extending tooth configured for selective engagement with an inner surface of a bore.

* * * * *